March 28, 1961  R. E. PEARSON  2,977,077
CARGO AIRPLANES

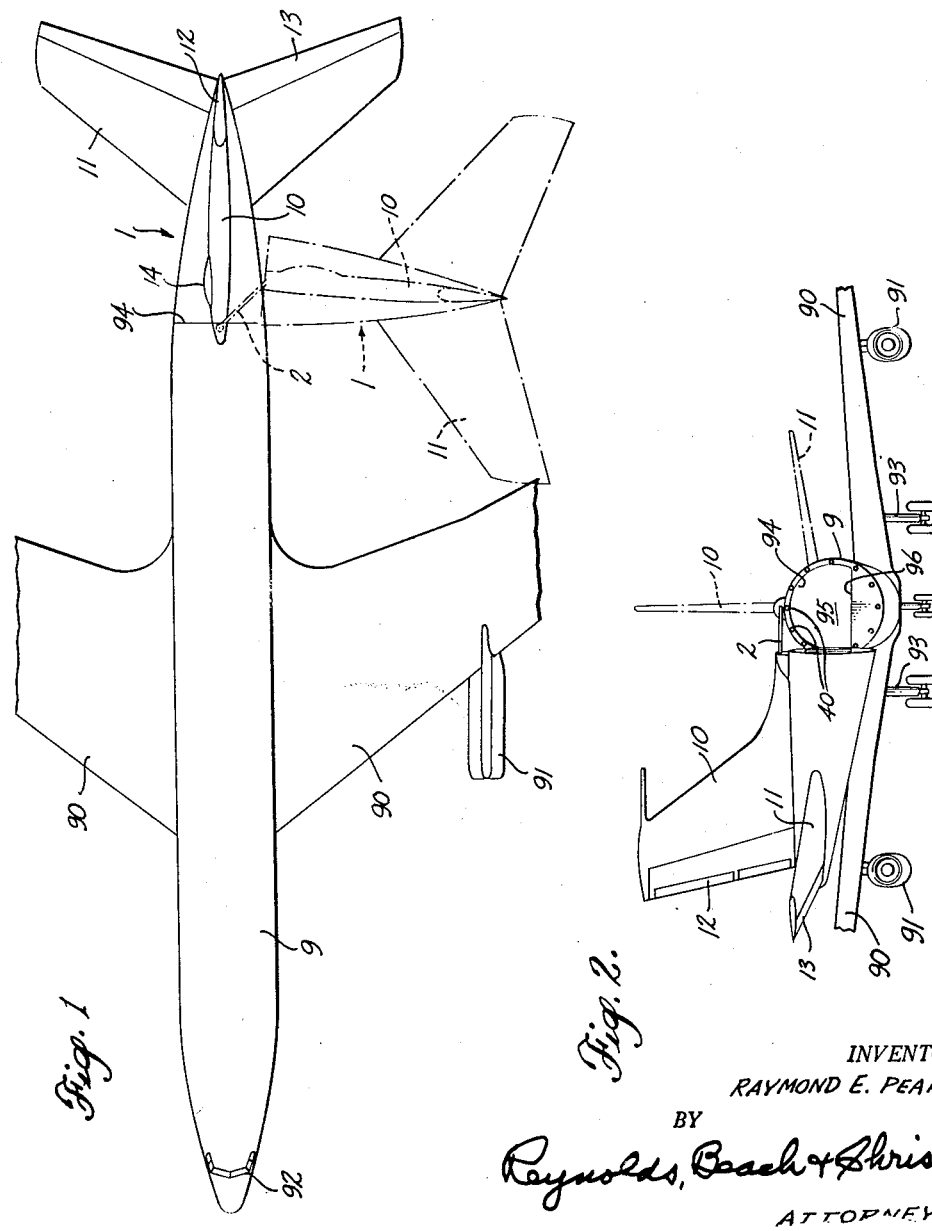

Filed Aug. 10, 1959  4 Sheets-Sheet 2

INVENTOR.
RAYMOND E. PEARSON
BY
Reynolds, Beach & Christensen
ATTORNEYS

INVENTOR.
RAYMOND E. PEARSON
BY
Reynolds, Beach & Christensen
ATTORNEYS

March 28, 1961 R. E. PEARSON 2,977,077
CARGO AIRPLANES
Filed Aug. 10, 1959 4 Sheets-Sheet 4
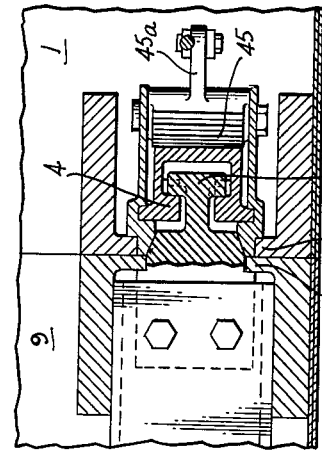
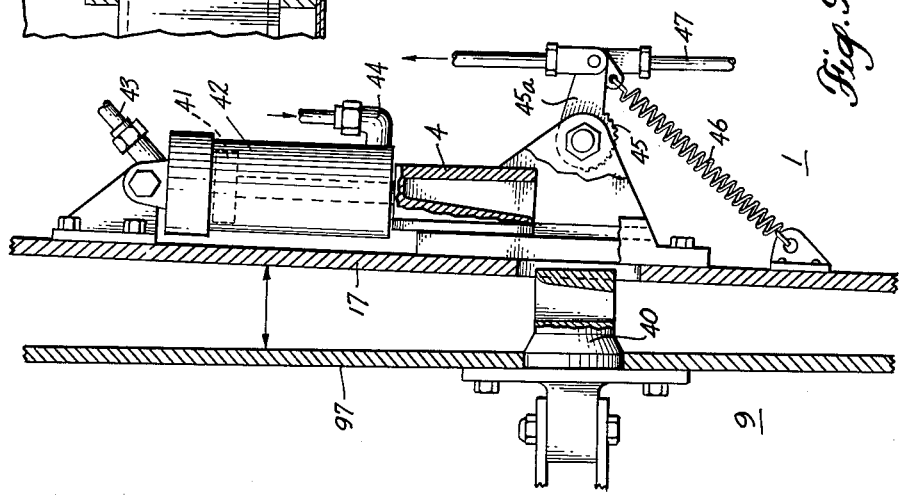
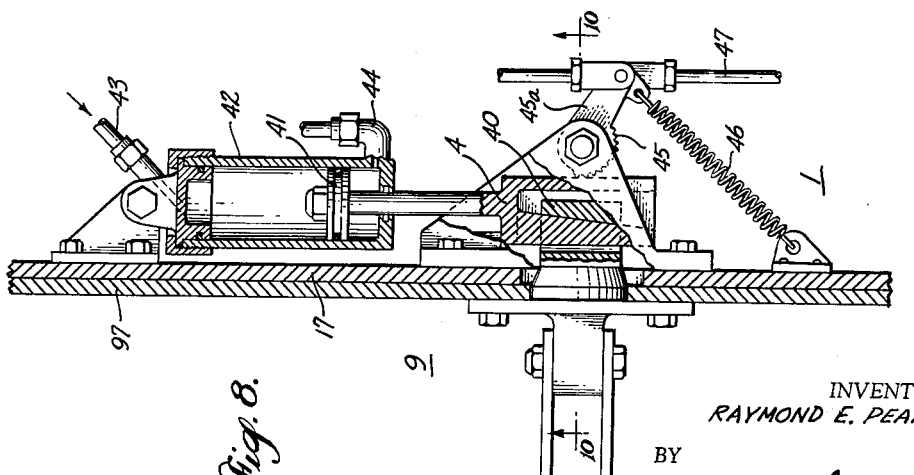
INVENTOR.
RAYMOND E. PEARSON
BY
Reynolds, Beach & Christensen
ATTORNEYS

United States Patent Office 2,977,077
Patented Mar. 28, 1961

2,977,077
CARGO AIRPLANES
Raymond E. Pearson, Bellevue, Wash., assignor to Boeing Airplane Company, Seattle, Wash., a corporation of Delaware
Filed Aug. 10, 1959, Ser. No. 832,699
2 Claims. (Cl. 244—118)

This invention concerns a cargo airplane, and more particularly the construction thereof which facilitates rapid and easy loading and unloading of all sorts of cargo, but especially large, awkward, and heavy units, in minimum turn-around time, yet permits the use of an airplane which in flight condition is substantially indistinguishable from, and performs in all respects comparably to, a bomber, a tanker, or a personnel carrier, and which can if required be used for such purposes.

Cargo airplanes heretofore designed for transporting large, bulky and heavy cargo units, such as trucks, tanks, long missiles, and the like, have been quite generally designed to open widely at one or the other end of the fuselage, or through a large bottom opening, which is not aligned with the main cargo space, and hence restricts at least the length of cargo units it can handle. If the opening were at the forward end, the control cabin had to be superimposed upon the cargo space, and the control cables or conduits extending aft to control surfaces at the tail had to avoid the cargo space. This produced a bulky design of large frontal area, and adversely affected the performance characteristics of the airplane. If the opening were at the rear end, it was always heretofore considered necessary to support the empennage upon separate booms, rather than upon any part of the fuselage which moved relative to the main part thereof, in order to avoid the necessity of disconnecting and later reconnecting the control cables or conduits across the juncture between any such relatively movable parts, and also in order to avoid any discontinuity and loss of ability to transmit flight stresses between the empennage-supporting tail portion of the airplane and the main wing-supported portion of the fuselage. The necessity of disconnecting and reconnecting control elements was highly undesirable because of the time required in so doing, and because of the possibility of human error in accomplishing the job, for error might result in destruction of the airplane. Discontinuity was to be avoided because the control surfaces at the tail are heavily stressed in flight, as is the wing-supported main fuselage, and these stresses must be transmitted to and absorbed by the entire structure of the fuselage, hence any discontinuity, or any failure of wholly secure reconnection, admitted the possibility of structural failure, or even loss of the entire tail, during flight.

By this invention there is provided a cargo airplane the fuselage and tail whereof constitute one continuous whole, structurally and aerodynamically, yet the tail portion of the fuselage, carrying the empennage, is swingable aside to afford unobstructed straight-in access through the rear opening thus opened into the cargo space within the fuselage. After the loading or unloading operation is completed, the tail portion can be swung back into alignment with the fuselage proper and secured thereto about the entire periphery at the joint, by securing means which are so distributed about the periphery, are simultaneously movable into (and from) locked position, and in that position and distribution are adequate for transmission of stresses between the fuselage and the tail portion. The control rigging cables or equivalent control force transmission elements are never disconnected nor slackened, but extend across the hinge line in a manner to maintain their integrity and tautness in all positions of the tail portion. The tail portion may swing on an upright hinge axis, as shown herein, or the axis may be otherwise oriented, and in an alternative arrangement, not shown herein, the tail portion swings upwardly to open, about a transverse axis adjacent the upper portion of the fuselage skin.

By virtue of the construction outlined above the airplane is capable of handling cargo units of a height, breadth and length up to the full dimension of the cargo space and its opening, and of a weight up to the load capacity of the airplane. Such cargo units, by the employment of built-in or attached cargo-handling equipment which per se is not part of this invention, can be loaded or unloaded at any field whereon the airplane can land or take off. The turn-around time of the airplane is a minimum, since no disconnection or reconnection need be made, other than unlocking and relocking of the tail portion, and the chance of human error in converting from and to flight condition is virtually eliminated. As soon as the tail portion has been closed and locked, the airplane is ready to fly, and all its controls are ready to function.

The drawings of this application show a single form of construction, by way of example, but it should be understood that the claims are not to be limited to this form, except as their express language so requires, but instead are to be taken as claiming the invention generically.

Figure 1 is a general plan view of an airplane incorporating this invention, and Figure 2 is a rear view, with the tail section swung aside for loading or unloading. Control surfaces and the like which do not affect this invention have been omitted.

Figure 3:
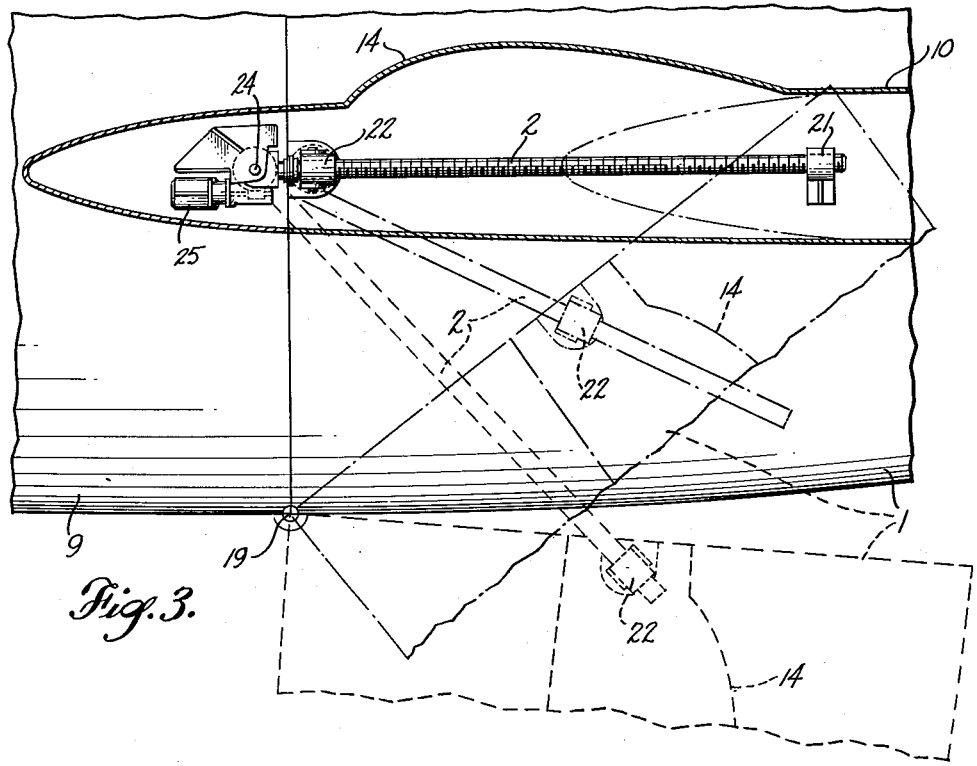
Figure 3 is a plan section through the vertical stabilizer, illustrating the mechanism for swinging the tail section and for retaining it in any given swung position.
Figure 4:
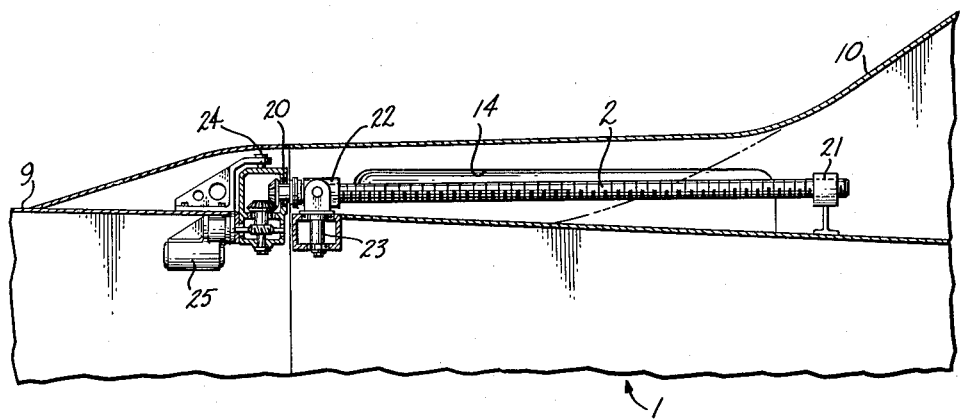
Figure 4 is a vertical sectional view illustrating the same mechanism.

Figure 8 is a sectional view, generally in the direction tangentially of the fuselage at the plane of juncture between the latter and the hinged tail section, but just within the fuselage skin, showing a suitable locking arrangement for securing the tail section in alignment with the fuselage, for transmission of stresses, and with parts in locked position, and Figure 9 is a similar view with parts unlocked and slightly separated.

Figure 10 is a transverse sectional view through a lock, on the line 10—10 of Figure 8.

The airplane is represented as a typical sweptwing jet-powered airplane generally of a type now flying, and capable of flight at higher sub-sonic speeds. It includes the fuselage 9 supported by wings 90 having pod-mounted jet engines 91, with the control cabin 92 in the nose of the fuselage. Landing gear 93 including the usual ground wheels and shock absorbing units supports the airplane when groundborne. The fuselage proper terminates aft in a rearward opening at 94, affording access to the entire cargo space 95—normally defined between the deck 96 and the skin of the fuselage, from the rearmost station of constant section (insofar as the deck level is part of that section) forwardly substantially to the control cabin 92.

The opening 94 is closed during flight, and the fuselage is completed, by a hingedly mounted tail section 1, which in the form chosen for illustration is hingedly mounted to the fuselage upon an upright axis 19, disposed at one side of the opening 94, and generally tangent to the skin of the fuselage 9. The hinges are formed as pylon protrusions spaced apart exteriorly of the fuselage. The tail section carries the usual vertical and horizontal fins or stabilizers 10 and 11 and associated control surfaces 12 and 13, respectively. Aerodynamic forces on these surfaces, it will be understood, create quite appreciable stresses, which must be transmitted to the fuselage proper. Control cables or equivalent force-transmitting mechanism must extend uninterruptedly at all times between the control cabin 92 past the hinge line at 19 to the control surfaces 12 and 13.

Hinging movement of the tail section 1 may be accomplished in any suitable manner. As shown, a lead screw 2 journaled at 20 in the fuselage 9 and at 21 in the tail section 1 threadedly engages a nut 22 fixedly positioned within but capable of pivoting at 23 with respect to the tail section 1. The forward end of the lead screw 2 is pivotally mounted at 24 to swing relative to the fuselage 9, and a reversible motor 25 is geared to the lead screw to rotate the latter, to run the nut 22 rearwardly along the screw for swinging the tail section aside, or forwardly to return the tail section into alignment with the fuselage. Compare the solid closed position of Figure 3, the dot-dash line partially open position, and the dash line fully open position. The vertical stabilizer may be bulged, at 14, to afford space for swinging of the rear end of the lead screw; see the dot-dash line position of Figure 3.

Figure 5:
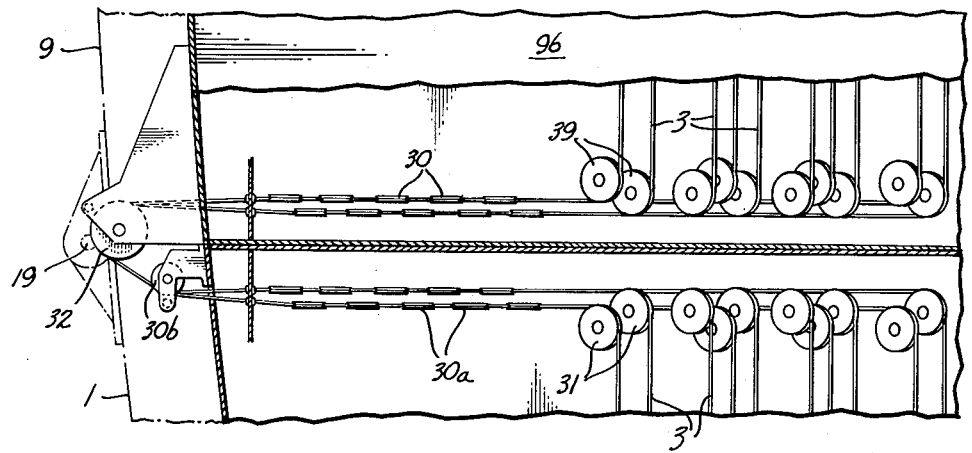
Figure 5 is a plan section, from the viewpoint represented by the line 5—5 of Figure 7, showing the control cables with parts in the vicinity of the hinge line in the flight position.
Figure 6:
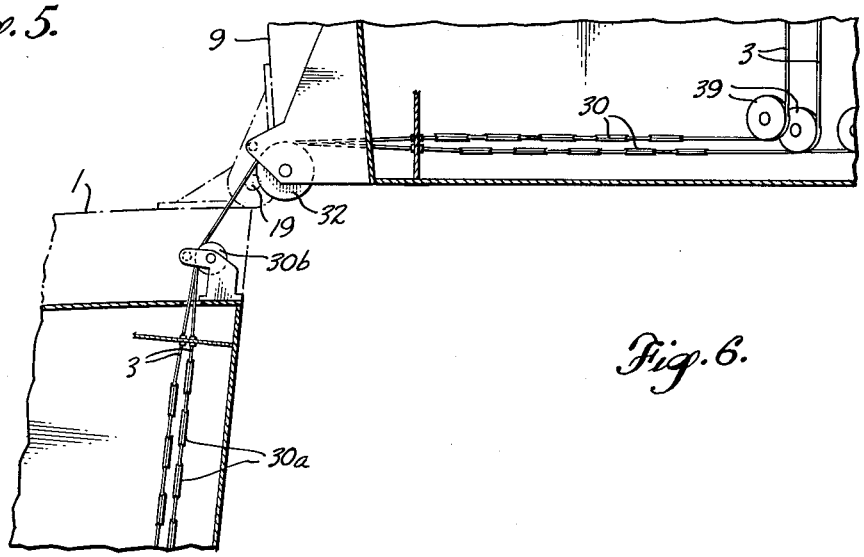
Figure 6 is a similar view but with parts in the loading position.
Figure 7:
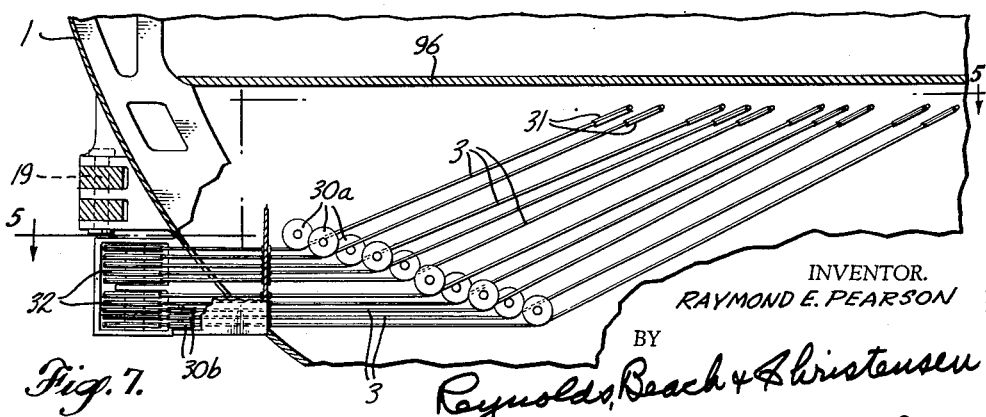
Figure 7 is a transverse sectional view, on a vertical plane close to hinge line, showing the rigging of the control cable to maintain them taut.

A major consideration in any such construction is to avoid the necessity of disconnecting control cables, or of reconnecting them, while yet maintaining them taut so that they may not become tangled, or engaged with other mechanism or structure, when the tail section is swung aside. An arrangement to these ends is shown in Figures 5 to 7. Cables 3 extend rearwardly from appropriate controls in the control cabin 92—usually beneath the deck 96—to the plane of the rearward opening of the fuselage. Whether these cables control the vertical or horizontal rudders, or tabs thereon, or other components carried by the tail section 1, is immaterial. At the plane of the opening 94 each cable extends about a sheave 39 upon the fuselage 9, and thence towards the hinge line 19. Sheaves 32 which more or less coincide axially with the hinge line 19 are provided, about which the cables 3 extend. They may also extend about intermediate sheaves 30, whereby to concentrate the cables in close grouping. From the sheaves 32 the cables extend again inwardly to sheaves 31 carried by the tail section 1, and intermediate sheaves 30a and 30b may also be used upon the tail section. From the sheaves 31 the several control cables extend rearwardly again, within the tail section, to their respective control surfaces or the like. The arrangement is such that the cables are maintained taut and uninterrupted in either the closed or the open position of the tail section, and in any intermediate position.

It would be futile to locate the control surfaces upon the swingable tail section unless the latter can be securely locked in its closed position, in such manner as to transmit stresses between the tail section and the fuselage. Typical mechanism to that end, but by no means the only suitable form thereof, is shown in Figures 8 to 10. A transverse stiffener 97 frames the rear end opening 94 of the fuselage and abuts, in the closed position, a like stiffener 17 that frames the forward end of the tail section 1. One or the other of these stiffeners, as the stiffener 97, carries pins or retainers 40 which project through holes in the stiffener 17, for engagement by locking bolts 4 carried by this latter stiffener. A number of such pairs of interengageable locking elements are distributed about the peripheries of these stiffeners. The locking bolts 4 are all arranged for actuation in common. For example, a piston 41 in a cylinder 42 is connected to each locking bolt, and movement of the pistons occurs simultaneously by reason of admission of a pressure fluid at 43 or at 44. The locking bolts and their retainers are complementally tapered (see Figures 8 and 9) so that they will tend to draw the tail section 1 tightly against the fuselage as they move into locked position. Retention of parts in the locked position is further assured by eccentrically mounted sprags 45 or the like which engage the locking bolts 4 in their locked position, and prevent unlocking movement thereof until the sprags are withdrawn. All the sprags 45 are urged into retaining position by springs 46, and can be positively moved in either direction, in unison, by connecting links 47 joining levers 45a integral with the sprags. A common actuator (not shown) may be provided for shifting the links 47.

During flight the tail section 1 constitutes a rearward streamlined continuation of the fuselage, closing the open rear end thereof. The locking devices 4, 40 are sufficient in number and distribution to transmit structural loads between the tail section and the fuselage, and the cables 3 function in the usual manner, although by an indirect path, to operate the control surfaces on the tail section. Upon landing the locking devices 4, 40 are disengaged, and the motor 25 being energized, the tail section is swung aside. Safety devices, to prevent such operations until the airplane is groundborne and at rest, or unitl other necessary conditions obtain, may be employed, as is common in the airplane art.

Now the entire cargo space is freely accessible. Cargo can be unloaded or loaded through the rear opening 94, of the full size of the constant-section portion of the fuselage. Cargo handling mechanisms, such as forms the subject of another application, will facilitate such operations. The operation completed, it is only necessary to swing the tail section into closed position, lock it, and take off. There is no possibility of failure to reconnect, possibly incorrectly, or at all, any control cable, nor of fouling them, for no disconnection was necessary, nor were they slack at any time. Turn-around time is reduced to a minimum, even at dispersed bases which have a minimum of cargo-handling equipment or facilities.

I claim as my invention:

1. A cargo airplane comprising a fuselage having a main cargo compartment terminating aft in an open end, a tail section constituting in flight a rearward continuation of, but separate from, said fuselage, hinge means at one side of the common meeting plane of the fuselage and tail section, joining the two for swinging of the tail section relative to the fuselage, means to lock the tail section in its flight position, means reacting between the fuselage and the tail section for swinging the latter between its flight position and an open position, wherein it clears the open end of the cargo compartment, control surfaces mounted upon and movable with respect to said tail section, control cables extending uninterruptedly from the fuselage to said control surfaces, and control cable guide means, including guide sheaves mounted generally coaxially of the hinge means, for the support and guidance of the control cables.

2. A cargo airplane as in claim 1, including further guide sheaves arranged in two groups, those of one group being mounted upon the fuselage, adjacent the common meeting plane, and those of the other group being similarly mounted upon the tail section.

(References on following page)

References Cited in the file of this patent

UNITED STATES PATENTS

| | | |
|---|---|---|
| 1,166,061 | Lehberger | Dec. 28, 1915 |
| 1,859,306 | Loening | May 24, 1932 |
| 2,095,440 | Hojnowski | Oct. 12, 1937 |
| 2,388,380 | Bathurst | Nov. 6, 1945 |
| 2,509,272 | Karnuth et al. | May 30, 1950 |
| 2,534,764 | Focht | Dec. 19, 1950 |
| 2,538,602 | Taylor et al. | Jan. 16, 1951 |
| 2,572,421 | Abel | Oct. 23, 1951 |

FOREIGN PATENTS

| | | |
|---|---|---|
| 129,688 | Great Britain | July 24, 1919 |
| 679,057 | Great Britain | Sept. 10, 1952 |